(12) United States Patent
Finn

(10) Patent No.: US 6,311,642 B1
(45) Date of Patent: Nov. 6, 2001

(54) NESTING STRUCTURE FOR EARTH-BURROWING BIRDS

(76) Inventor: Joseph Finn, 922 Massachusetts Ave. #53, Cambridge, MA (US) 02139

( * ) Notice: Subject to any disclaimer, the term of this patent is extended or adjusted under 35 U.S.C. 154(b) by 0 days.

(21) Appl. No.: 09/561,055

(22) Filed: Apr. 28, 2000

Related U.S. Application Data

(60) Provisional application No. 60/131,861, filed on Apr. 29, 1999.

(51) Int. Cl.$^7$ .................................................. A01K 31/14
(52) U.S. Cl. ............................................ 119/329; 119/346
(58) Field of Search ................................. 119/329, 346, 119/428, 441, 437; D30/108

(56) References Cited

U.S. PATENT DOCUMENTS

| | | | |
|---|---|---|---|
| 1,923,980 | * | 8/1933 | Hultine .................................. 119/329 |
| 2,174,326 | * | 9/1939 | Leibenguth ........................... 119/329 |
| 2,892,447 | * | 6/1959 | Kenn et al. ........................... 119/329 |
| 3,044,444 | * | 7/1962 | Rosenthal ............................. 119/329 |
| 3,292,583 | * | 12/1966 | Peterson .............................. 119/329 |
| 5,423,290 | * | 6/1995 | Payne .................................... 119/329 |
| 6,095,089 | * | 8/2000 | Finn ...................................... 119/329 |

* cited by examiner

Primary Examiner—Charles T. Jordan
Assistant Examiner—Judith A. Nelson
(74) Attorney, Agent, or Firm—William Nitkin

(57) ABSTRACT

A nesting structure for earth-burrowing birds is disclosed which provides spaces above ground for multiple pairs of these colonial underground nesting birds to build their nests in. The structure provides an extensive upright face of earthen color and texture, suggestive of the natural exposed vertical riverbanks and similar upright earth forms which attract these birds. Openings in the upright face allow birds to pass through ready-made protective artificial nesting tunnels, leading back from the front face, into enlarged artificial nesting chambers at the rear of the nesting structure. These individual nesting chambers, arranged in orderly fashion, are accessible through resealable doors. This access permits convenient, effortless, non-disruptive inspection, management and research of the nestings of those birds whose nests have been, until now, inaccessibly and randomly dug underground. The nesting structure, being of durable man-made materials, either one of wood, metal, plastic and cured masonry, is not subject to the erosion or collapse expected in natural earthen nesting banks. The structure protects nesting cavities and contents from the dangers of saturating rain and certain burrowing predators which threaten natural earthen nests. The structure, being of standard building materials, is economical to build, lightweight, able to be assembled in the field, and adaptable to different mountings and settings, as well as to sensitive landscapes. As a freestanding structure specifically designated for nesting birds, the nesting structure is not subject to destruction through massive erosion, human development, earth-moving operations or flooding, as natural nesting sites are. Various embodiments allow birds to dig, or partially dig, their own tunnels and/or nesting chambers, while still directing this digging to the rear of the structure for convenient human access.

20 Claims, 7 Drawing Sheets

NESTING STRUCTURE FOR EARTH-BURROWING BIRDS

This application claims benefit of provision of application Ser. No. 60/131,861 filed Apr. 29, 1999.

BACKGROUND OF THE INVENTION

1. Field of the Invention

The present invention relates generally to nesting structures for wild birds, and more particularly to an artificial multiple nesting structure simulating the vertical earthen banks, excavations and piles into which certain burrowing birds dig their horizontal nesting tunnels and chambers.

2. Description of the Prior Art

Bank swallows, rough winged swallows and kingfishers once nested only in natural settings such as in the substantially vertical earthen banks of rivers, lakes, oceans, or eroded earthen cliffs. In such settings, they burrow nearly horizontally into the exposed vertical face of such a bank or cliff, creating relatively long tunnels leading to enlarged nest chambers. These birds have also adapted to nesting in semi-natural, man-made, substantially vertical earthen banks, such as might occur in sand pits, clay pits and similar excavations. They will also nest in piles of sand or topsoil where excavating or earth-moving equipment has created vertical faces. Some of these species may nest, rarely or routinely as the case may be, in horizontal drainage pipes set in vertical masonry retaining walls or bridge foundations.

When bank swallows nest in natural sand or clay river banks, etc., they usually choose a high section of bank or cliff face which is nearly vertical. The height and verticality protect the chosen nest sites from climbing predators. Bank swallows prefer bank or cliff faces which offer fine soil relatively free of stones or obstructions to digging, compacted soil supportive of their arched tunnels and nest chambers, and sufficient surface area to accommodate the many closely spaced nests of a colony of numerous breeding pairs. Often these multiple nest entrances are arranged along horizontal lines in the exposed bank face, which correspond with horizontal layers of preferred sand, clay or other soils, as deposited long ago when the bank was formed naturally.

Nest entrances appear as holes in the bank face. Often these entrances are within 12 inches of other entrances. Tunnels approximately the same size as the entrances are dug into the bank approximately perpendicular to the vertical bank face. Tunnels generally slope slightly upward away from the entrance. Tunnels may vary in length, from several inches to a few feet. At the inner ends of the tunnels are enlarged nest chambers, also dug in the earth. Nest entrances, tunnels and chambers are generally (horizontally) elliptical in cross-section or arched with flattened floors.

When digging is finished, bank swallows add straw, grass and feathers to complete a nest in the chamber.

When bank swallows nest in semi-natural man-made situations, such as landfill excavations and loam piles, they usually choose the bank face which is most vertical, most recently cut by the bucket loader, and thus, unfortunately, most likely to be disturbed again soon.

When rough-winged swallows nest in natural or semi-natural settings, it is usually in the earthen burrows created by bank swallows.

When rough-winged swallows nest in man-made drainage pipes set in riverside retaining walls or bridge foundations, these pipes are usually dangerously close to normal water levels, and often below high water marks of flood stage.

When kingfishers nest in natural or semi-natural settings, they are often attracted to the same conditions which attract bank swallows. However, unlike bank swallows, kingfishers do not nest with other pairs of their own kind. Kingfishers, being larger, make and require larger nesting cavities.

Earth-burrowing birds are declining or are underpopulated in some regions. The replacement of many suitable natural river bank nest sites with human development has limited their breeding. The frequent destruction of nest sites in semi-natural, man-made sand pits, landfills, and excavations by ongoing, necessary earth-moving operations, also takes a toll. And the flooding of low-lying drainage pipes during periods of heavy spring rain destroys the nests of birds which resort to such inferior, artificial nest sites.

Beyond the limitations associated with these prior art nesting situations, earth-burrowing birds are entirely prevented from breeding wherever the natural or man-made landscape offers not even an inferior nesting site. Thus, these beautiful and beneficial birds are absent from areas which could otherwise support thriving populations.

The soils in banks, cliffs, piles and excavations may cause problems for burrowing birds. Topsoil or gravel may contain so many stones or roots as to force birds to abandon a site after days of wasted digging. Sand may be so coarse and granular as to collapse on eggs, nestlings or adults.

Heavy rain may cause collapse of nesting tunnels and chambers, or may cause the vertical face of the bank or pile to shear off entirely. Rain may so saturate the soil that eggs, nestlings and adults are dampened and fatally chilled.

Soils which are soft enough to permit burrowing are also soft enough to permit erosion. While erosion, such as the undercutting action of the flow of a river, may create and renew the vertical face of a river bank, collapse of a bank face during the nesting season is disastrous for these birds.

Predation at nesting sites is sometimes a problem for burrowing birds. Although the loose soil, verticality and height of a nesting bank face are resistant to climbing by predators, the relatively soft soil of a nesting bank permits digging by predators, such as foxes, ferrets and badgers.

Native burrowing birds are sometimes attacked or driven from their burrows by destructive alien birds, such as house sparrows. It is difficult to trap sparrows or remove sparrows nests in earthen burrows.

In prior art settings, nests are inaccessible to humans without great effort and great risk of damage and disruption to nestings. Since nest chambers are buried in relatively loose and thus collapsible soil, painstaking and time-consuming care would be necessary to temporarily unearth a single nest chamber for inspection, wildlife management or research purposes. Restoring the nest chamber to permit the nesting to continue would be similarly challenging. The random lengths of nesting tunnels would make estimating the exact location of the nesting chambers difficult. Any exploratory digging by humans from above a sand bank or from behind a loam pile, to access nests, would both weaken the earthen nest site as well as frighten the birds.

In many settings, no digging by humans would be possible without damaging the natural or man-made landscape.

In some prior art artificial settings, nests in drainage pipes set in bridge foundations are completely inaccessible from above or behind.

Burrowing birds may abandon prior art earthen nest sites when these sites become infested with bird lice, mites and the dirty debris from previous nestings. It is difficult, if not impossible, to adequately clean such prior art sites to encourage reuse.

With erosion, collapse and parasite infestation of prior art earthen banks, nesting sites are often not used repeatedly enough to justify the intentional creation of earthen banks by humans to benefit these birds.

If someone did want to create a vertical nesting bank either by cutting away a hillside or dumping and shaping a pile of topsoil, the initial expense and maintenance would be considerable. Heavy equipment, or many, many man-hours would be required to maintain the bank for perhaps just one season's usage.

It further may be illegal to create such a natural nesting site of loose, erodable soil near the protected wetlands these burrowing birds prefer. It may be impossible to transport the large volume and weight of earth necessary for such a created site, through sensitive landscapes.

Finally, prior art multiple compartment birdhouses such as pole-mounted purple martin houses do not ever attract nest burrowing birds. The artificial materials, inappropriate interior dimensions, small external surface areas and elevated isolation from the earth may cause burrowing birds to see no attractive similarity with the earthen banks they nest in.

SUMMARY OF THE INVENTION

It is, in general, an object of the present invention to provide an artificial multiple nesting structure which is, highly attractive to bank swallows and other bank-burrowing birds, simulates a natural bank, is passively protective of nests, permits convenient, non-disruptive, protective, active internal human management and research access of occupied enclosed nests, is adaptable to and appropriate for both man-made and sensitive natural landscapes, is orderly in appearance and economical to create and maintain for annual reuse, as specified in the further objects stated below.

It is a further object of the present invention to simulate the external surface orientation, shape, size, color, texture and internal cavity orientation, shape, size, color and texture of natural banks attractive to burrowing birds.

It is a still further object of the present invention to provide a self-contained, ideal multiple nesting structure which is not dependent on earthen mounds or the earth itself to provide the space in which these burrowing birds will nest.

It is a further object of the present invention to provide a structure specifically designated for burrowing birds which otherwise might nest in natural or semi-natural man-made sites subject to elimination during the breeding season through massive erosion, human development, earth-moving operations, or flooding.

It is yet a further object of the present invention to provide a nesting structure to compensate for the historical loss of natural breeding sites.

It is a further object of the present invention to provide a nesting structure to support populations of burrowing birds in areas which do not now, nor have ever supported such populations in breeding season, due to a lack of natural or semi-natural man-made earthen nesting sites.

It is yet a further object of the present invention to provide a nesting structure for burrowing birds which reduces or eliminates the need for time-consuming burrowing, or offers only preferred compactable fine soils free of stones, large roots and other obstructions to their digging.

It is a still further object of the present invention to provide a nesting structure in which the bank face, nesting entrances, nesting tunnels and nesting chambers are less susceptible to, or free from, the threat of disruptive or fatal collapse.

It is yet a further object of the present invention to provide structure to shield nesting tunnels, and especially nests, eggs, nestlings and adults in nesting chambers, from the potential collapse and fatal chilling effects caused by heavy, saturating rain.

It is a further object of the present invention to provide structure to reduce or eliminate predation of nests by burrowing predators such as foxes, ferrets and badgers.

It is a further object of the present invention to provide a freestanding, self-contained structure which allows practical, convenient, non-disruptive access to the normally (in the prior art) inaccessible earthen nests of burrowing birds. This practical, convenient accessibility is to be achieved with minimal human effort, requiring little or no displacement of soil or particulate matter. This convenient, non-disruptive accessibility is to be achieved with minimal human expenditure of time at the nesting site, allowing birds to quickly resume normal breeding activities. This non-disruptive accessibility is to be achieved with minimal risk to nest cavities, nests, eggs and nestlings. This accessibility is to be achieved without weakening or subjecting nesting tunnels, chambers or banks to future collapse. This access to nests is to be easily reversible by convenient, secure closure or replacement of nesting chambers by virtue of the structure of the present invention.

It is a further object of the present invention to achieve the convenient accessibility to nests specifically by providing structure which encourages birds to dig their (normally randomly located) nest chambers where they are more predictably locatable by humans, with minimal exploratory human digging, or to force birds to use nest chambers which are positively located with no such human digging.

It is a further object of the present invention to permit such access to nest chambers for several specific in-season purposes: to conveniently and effectively trap destructive alien birds in the nest chambers; to remove alien nests from the nest chambers; to otherwise hygienically maintain or manage nests within the breeding season; to study, photograph and enjoy the breeding cycle more closely; and to band nestlings or adults for research purposes.

It is a further object of the present invention to permit convenient, effective purging of parasites and unhygienic debris after the nesting season and to otherwise recondition the cavities for annual reuse, permitting far longer life than erodable, collapsible, parasite-infested natural sites.

It is a further object of the present invention to provide an artificial structure which is economical to fabricate from standard building materials; transportable without heavy equipment which can be assembled in the field; mountable or attachable by several unique means; collapsible (in some embodiments) for inconspicuous off-season, on-site storage; and orderly in appearance.

It is a still further object of the present invention to limit or prevent leaching of particulates (soils) into sensitive wetlands where location of such a structure would be certain to attract and benefit burrowing birds.

It is yet a further object of the present invention to assume various configurations to suit various natural and man-made landscapes and various mountings.

Lastly, it is a further object of the present invention to provide various embodiments to accommodate the varying inclinations and adaptabilities of earth-burrowing birds to accept such artificial nesting banks as yet to be fully determined through deployment in various regions and through time.

The present invention fulfills the foregoing objects in specific ways to be described further below of the general form and function of the preferred embodiment: a substantially upright face or surface is presented toward an open outdoor space, such as an open field or river. The face presents considerably more frontal area to the eye than would a frontal cutaway view of nesting chambers associated with the face, unlike a typical birdhouse. The large upright face suggests the mass and verticality of an earthen bank or cliff attractive to bank swallows, rough-winged swallows, kingfishers and other bank-burrowing birds. The lower edge of the face rests on the ground or water surface. Though generally upright, the face need not be exactly vertical, as natural banks and cliffs are not exactly vertical. The face may be straight, concave, convex, undulating, irregular or intersecting with another face along its (horizontal) length. Usually, but not necessarily, the face would be longer than high to simulate natural banks, to complement the landscape, and to achieve stability. The face may be of relatively minimal thickness, such as might be created by a single layer of plywood, a single layer of boards or planks, or a layer of mortar applied to expanded metal lath. Such a thin layer would require attachment to an inner wall framework, such as "2×4" lumber, to stiffen and support the face against the wind.

The surface of a plywood or wooden face should be horizontally painted with a flat, earth tone, sand-textured paint or adhesive masonry slurry to simulate a horizontal strata, texture and color which might be found in an earthen bank.

The surface of a mortar-over-metal-lath face should be finely grained, and horizontally applied, to simulate geologically formed strata of a natural sand, clay or soil bank. The metal lath may be puckered inwardly or outwardly to simulate the irregularities in the surface of a natural bank.

Multiple entrance holes are formed in the face, preferably in imperfect horizontal rows towards the top of the face, to simulate a preexistent natural nesting bank. The elevation of these entrances affords protection from ground predation.

The entrance holes in the front face are aligned with the interior front ends of tubes which extend back toward larger cavities aligned with the back ends of the tubes. The tubes extend more or less directly backward, or perpendicularly or nearly so, from the surface of the artificial bank face when seen from an overhead plan view. The tubes extend more or less horizontally backward, or preferably, extend backward and slightly upward, when seen from a side elevational view, as do naturally occurring tunnels of bank-burrowing birds.

The tubes simulate natural nesting tunnels. The interiors of these simulated tunnels may be textured with flat sand paint or adhesive masonry slurry, or, if made of steel, allowed to rust to achieve a natural gritty texture and color. The tubes may be (horizontally) elliptical in cross-section to simulate bank swallow tunnels. The tubes can also be round or rectilinear in cross-section, as would be the case if made of readily available metal, plastic, or fired clay tubing or pipe. The tubes can even be formed of wood. The tubes can be free of loose sand or particulate matter, or can be partially or completely filled with compactable fine-screened sand, clay, loam, etc.

The larger cavities, aligned with the back ends of these tubes, simulate the enlarged nest chambers naturally dug at the inner (back) ends of such tunnels.

Burrowing birds can enter through the entrance holes in the front face of the present invention, pass into and through the tubes, or tunnels they may dig within these tubes, into the enlarged cavities or simulated nest chambers at the back of the present invention.

The enlarged cavities or simulated nest chambers can be made of materials similar to the materials of the tunnel tubes. The interiors of these cavities can be treated or naturalized in the same way as the interiors of the tunnel tubes, as described above.

A back wall, support board or framework, approximately equidistant from the front face along its height and length, supports the back ends of the tunnel tubes and nesting chambers.

The structures which enclose the nest chambers can be fitted with doors, permitting temporary human access to the nests within. Alternately, the structures which enclose the nest chambers can be removable from the back wall, exposing the nests within.

Roof panels, end panels and sun/rain shields protect and aesthetically complete the nesting structure.

The combination of extensive surface area, verticality, texture, and color of the face, along with the orientation, internal size, shape, texture and color of nesting cavities is capable of satisfying the nesting instincts of certain earth-burrowing birds.

As a self-contained, freestanding structure, the present invention offers appropriate space for nesting independent of the earth (ground) or earthen mounds. This independent, designated breeding space is not subject to the massive erosion, human development, earth-moving operations, or flooding of natural or semi-natural man-made sites. As such, the structure of this invention may compensate for the historical loss of such sites as well as expand breeding populations into new areas which have never had natural sites.

The artificial tunnels offer ready-made nesting cavities or, if packed with fine sand or similar particulate material, the tubes offer birds satisfaction in digging without encountering stones, roots or obstructions.

The artificial bank face and artificial cavities, being of man-made building materials, are not subject to collapse in the preferred embodiment, and collapse in some alternate embodiments would be reduced and limited.

As nesting cavities are protectively contained, nests, eggs, nestlings and adults are safe from saturating rain and certain burrowing predators.

The freestanding structure, standing independently above the earth, offers convenient access to nests without extensive, laborious, exploratory digging by humans, and without risk and disruption to nesting birds and the landscape.

The orderly arrangement, length and sizing of nesting tubes and the chambers, forces birds to build nest linings, lay eggs, and raise young at the back of the nesting structure in orderly, accessible fashion to favor inspection, management, photography, and research of these normally inaccessible ground dwellers.

The means of support of artificial nest tunnels and chambers allows for easy removal for cleaning and reconditioning.

The present invention may be made of readily available, economical, standard building materials, such as plywood, lumber, mortar, metal lath, and various types of pipe or tubing.

Being light in weight compared with large volumes of soil, the structure is transportable through sensitive environments and easily assembled in the field. It may be disassembled and stored off-season. It may be mounted in a variety of ways impossible with the loose earth of the prior art.

Since the present invention is not subject to erosion, it may be used in sensitive wetlands and may take on various configurations aesthetically or practically suited to various landscapes. The present invention may be provided in various embodiments to accommodate varying inclinations and adaptabilities of birds to accept such embodiments, and it may be provided in various embodiments to accommodate varying human construction or management concerns.

The size, configuration and texture of surfaces presented to the birds simulate the surfaces to which such birds are naturally attracted. The size of the surface(s) presented to the birds may accommodate multiple entrances to multiple nesting tunnels and chambers, thereby accommodating different bird species and/or multiple nesting pairs of the same species. The depth of the structure accommodates nesting tunnels of the length these birds prefer. The orderly, spaced arrangement of multiple nests which may be encouraged by the present invention permits a high density colony of nesting birds relative to overall size of the structure. This orderly, spaced arrangement of nests, as well as the self-contained, freestanding structure of the present invention permits inspection, human management, and study, of nests which would otherwise be randomly and inaccessibly dug into the earth in natural sand banks, for example. As a self-contained unit, the present invention may be placed in a variety of ways in landscapes which otherwise would offer no opportunity for nesting by bank-burrowing birds. The nesting structure of the present invention is not subject to collapse, damage by erosion, and certain burrowing predators as natural sand banks are and may be cleaned internally for reuse by birds each year. The present invention encourages the birds to locate nests where they are more predictably locatable with minimal human exploratory digging, or positively locatable with no such digging. Thus, with the present invention nests are conveniently accessible for human inspection, wildlife management, research, or cleaning for reuse with little human effort, no damage to nestings or landscapes and minimal disruption to the birds. The present invention permits annual reuse of the nesting site with minimal human maintenance. The erosion-resistant, lightweight and easily assembled construction of the present invention may permit use in, or transport through, sensitive landscapes.

DESCRIPTION OF THE PREFERRED EMBODIMENT(S)

A brief explanation of the prior art in reference to the drawings will provide an understanding of the objects of the invention and the limitations of the prior art, as illustrated in FIGS. 1–5.

Figure 1:
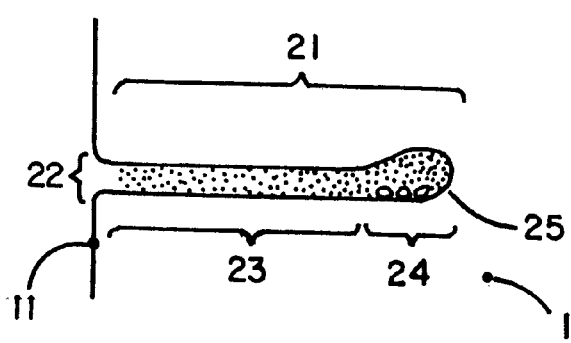
FIG. 1 illustrates a cross-sectional view of a prior art natural nesting burrow.

Referring to the drawings, FIG. 1 illustrates a cross-sectional side view of a natural nesting burrow 21 having nest entrance 22, nest tunnel 23, enlarged nest chamber 24, and nest lining 25. Nest entrance 22 is formed in natural bank surface 11. Nesting burrow 21 is formed in the earth 1.

Figure 2:
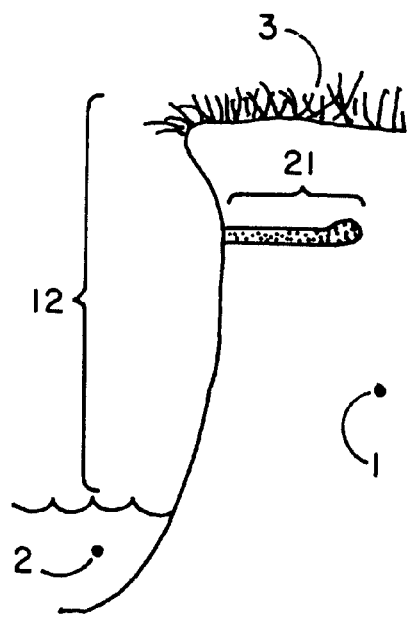
FIG. 2 illustrates an enlarged cross-sectional side view of the natural nesting burrow of FIG. 1 situated in a natural bank.

FIG. 2 illustrates a cross-sectional side view of natural nesting burrow 21 dug in natural earthen bank 12. Earth 1 has been shaped to form natural earthen bank 12 by soil erosion at the base caused by body of water 2 versus soil retention at the top caused by growing vegetation 3.

Figure 3:
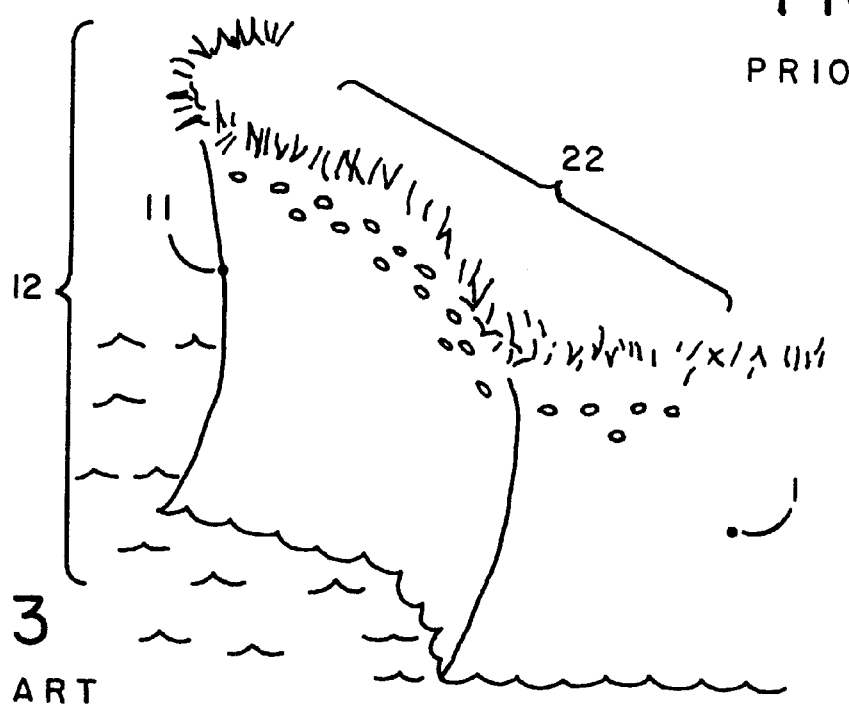
FIG. 3 illustrates a perspective view of a prior art natural earthen bank showing multiple nest entrances.

FIG. 3 illustrates a perspective view of natural earthen bank 12 showing multiple nest entrances 22 formed high along bank surface 11, as bank swallows are inclined to do. Natural earthen bank 12 is part of earth 1.

Figure 4:
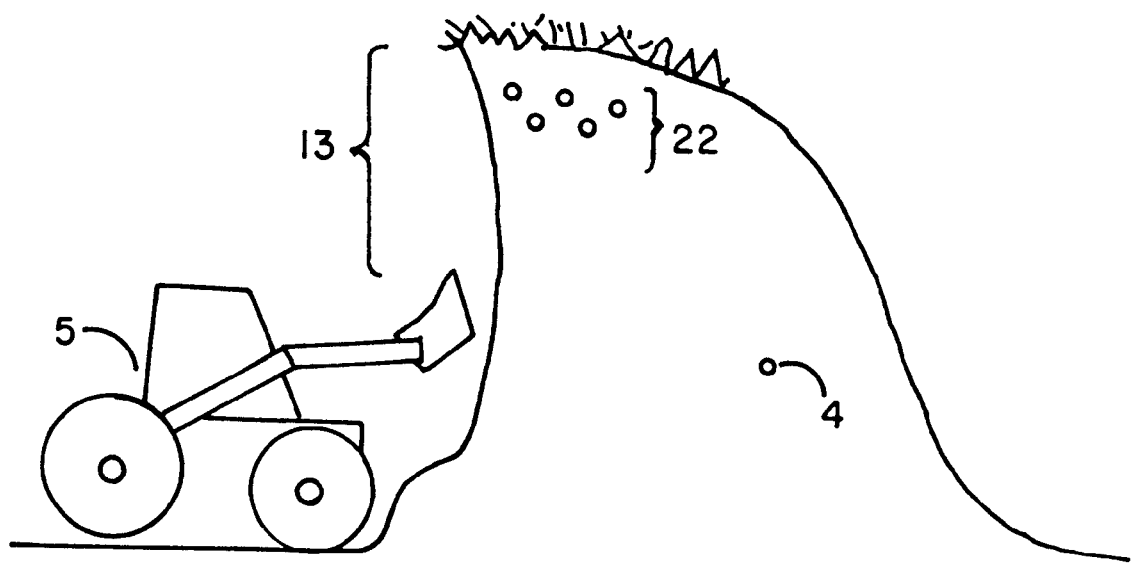
FIG. 4 illustrates a side view of a prior art man-made vertical bank being formed by a bucket loader.

FIG. 4 illustrates a side view of processed soil pile 4 showing that bucket loader 5 has formed vertical semi-natural bank 13, yet threatens to destroy nest entrances 22.

Figure 5:
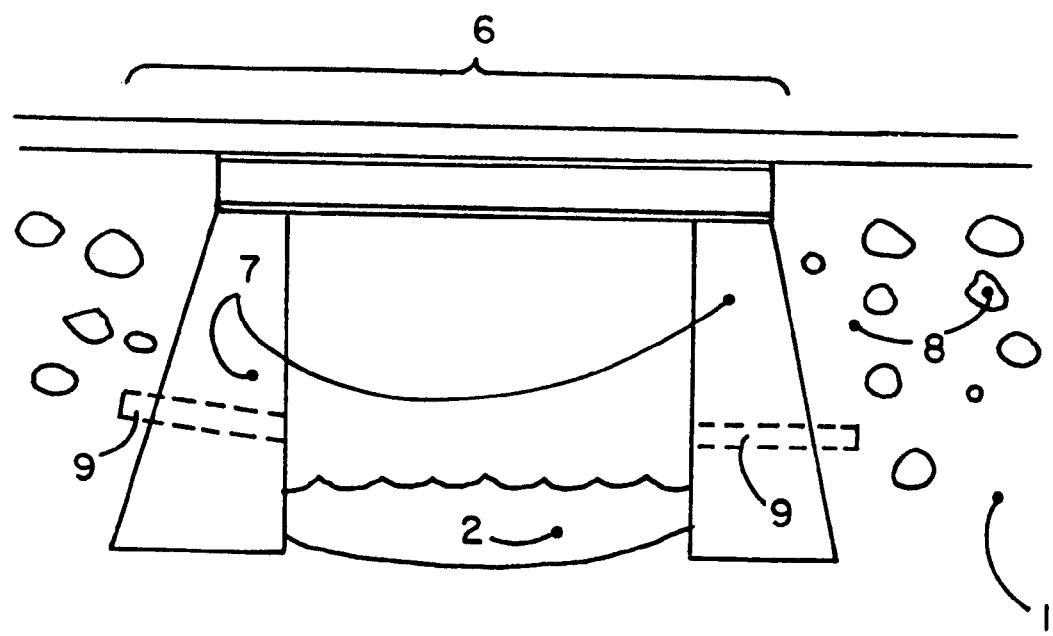
FIG. 5 illustrates an elevational side view of a prior art bridge having drainage pipes therein.

FIG. 5 illustrates an elevational side view of bridge 6 disposed over body of water 2. Concrete foundations 7 hold back earth 1 and solid fill 8. Drainage pipes 9 denoted by broken lines are embedded in foundations 7 and earth 1 or solid fill 8.

Prior art nesting situations shown in FIGS. 1–5 are subject to some or all of the problems or limitations already detailed in the Description of the Prior Art, including: loss of site through human development, earth-moving operations or massive natural erosion, collapse of nesting bank face, collapse of individual nesting burrows, obstructions to burrowing such as stones or roots, saturation by rain, flooding, predation by burrowing predators, infestation by parasites, and inaccessibility to human inspection, management and research.

While the nesting structure of this invention may be embodied in many different forms, a preferred embodiment is illustrated and will be described in specific form with the understanding that the disclosure is to be considered as one embodiment of the principles of the invention and is not intended to limit the invention to the specific embodiment illustrated and described.

Figure 6:
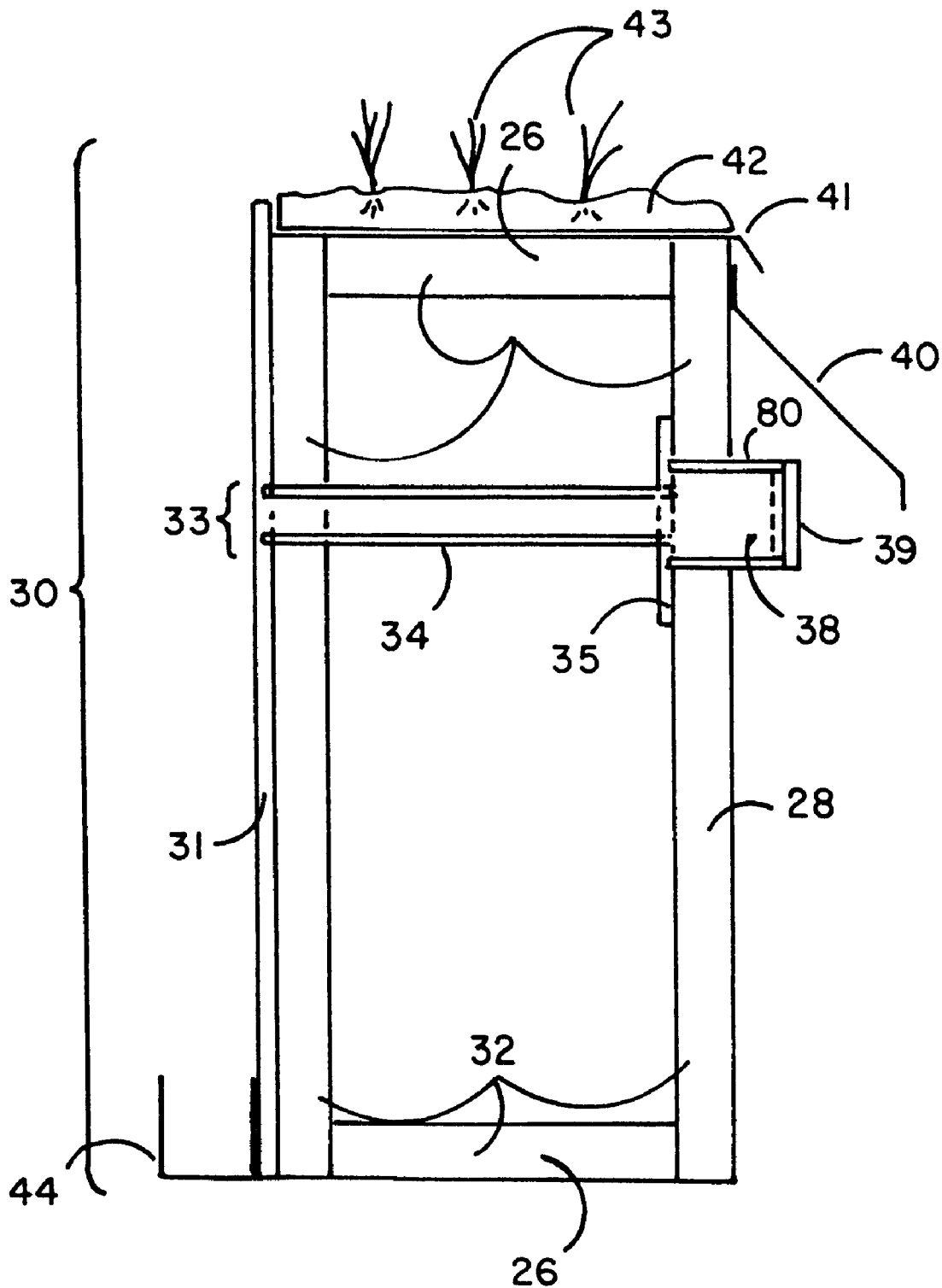
FIG. 6 illustrates a cross-sectional side view of the nesting structure of this invention.

Referring again to the drawings, FIG. 6 illustrates a cross-sectional side view of the artificial nesting structure 30 for burrowing birds of this invention. Upright face 31 is to be oriented toward an open space such as a field or river. Upright face 31 simulates the large, substantially vertical, or substantially upright, surfaces of exposed earthen banks or piles, as seen in FIGS. 3 and 4, which bank-burrowing birds are attracted to. Upright face 31 is considered to be the front of nesting structure 30.

It is important in attracting earth-burrowing birds that, when viewed frontally, the area of upright face 31 be substantially greater than the cumulatively measured area, when viewed frontally, of cross sections of all nesting chambers 38 combined.

The substantially upright or substantially vertical orientation of upright face 31 is important in attracting burrowing birds. If upright face 31 is straight along its height, when seen from a side view as in FIG. 6, then the upright axis (or plane if applicable) of upright face 31 may be exactly vertical for simplicity in construction and attractiveness to burrowing birds. Or such a straight upright face 31 may be within 45 degrees of true vertical.

If upright face 31 is concave, convex or otherwise irregular along its height, when seen from a side view, then the overall axis should be within 45 degrees of true vertical, or preferably, nearly vertical.

Upright face 31 can be made of economical, standard building materials such as 4'×8' plywood sheet, boards or mortar applied to expanded metal lath.

If upright face 31 is of mortar applied to expanded metal lath, that metal lath can be puckered, stretched or otherwise formed in non-planar fashion to simulate the curves, jags and irregularities of a natural earthen bank.

Upright face 31 should be sand-painted and/or slurry textured to simulate the colors and textures of horizontal strata of naturally deposited sand, etc., or the fine particulates which might be found in piles of screened loam, etc. Such treatments of upright face 31 increase the chance of acceptance by burrowing birds.

Upright face 31 is supported and stiffened to resist the wind by attachment to structural frame 32 which may be made of economical, available "2×4" or other standard dimensional framing lumber.

As seen in FIG. 6, artificial nest entrance 33 is formed in upright face 31. Artificial nest tube 34 is aligned with artificial nest entrance 33 and is approximately perpendicular to upright face 31 when seen from an overhead view, if upright face 31 is straight along its length when seen from an overhead view. If upright face 31 is concave, convex or irregular along its length when seen from an overhead view, then the orientation of artificial nest tube 34 should be as directly back from upright face 31 as construction practicality considerations permit.

Artificial nest tube 34 is approximately perpendicular to upright face 31, as seen in FIG. 6, when seen from a cross-sectional side view. Preferably, as shown in FIG. 6, artificial nest tube 34 should slope slightly upward away from upright face 31.

When upright face 31 is concave, convex or otherwise irregular along its height when seen from a cross-sectional side view, artificial nest tubes 34 should be nearly horizontal or sloping slightly upward away from upright face 31.

The orientation of artificial nest tubes 34 with respect to upright face 31, or with respect to true vertical or to true horizontal, is important in simulating the orientation these birds usually favor in creating a natural nesting burrow 21 such as shown in FIG. 2.

Artificial nest tube 34 extends toward the back of artificial nesting structure 30. Although only one is shown in FIG. 6, there can be several similarly oriented artificial nest tubes 34 to accommodate multiple pairs of burrowing birds. An enlarged artificial nest chamber 38 is aligned with the back end of artificial nest tube 34.

Both artificial nest tubes 34 and artificial nest chambers 38 are supported toward the back of artificial nesting structure 30 by back support board 35. Back support board 35 is attached to, and supported and aligned by, back vertical portion 28 of structural frame 32 which is rigidly connected by horizontal members 26 with the front portion of structural frame 32.

Artificial nesting chambers 38 are fitted with back access doors 39 to permit convenient human access to their interiors.

The freestanding design of artificial nesting structure 30 permits convenient standing human access to these doors 39 without the effort, risk, damage and disruption associated with digging for the practically inaccessible earthen nests of the prior art.

Since access doors 39 are at the back of artificial nesting structure 30, human presence while inspecting interiors is relatively non-disruptive to birds which come and go through front upright face 31.

The relatively small cross-sectional internal dimensions of artificial nest tubes 34 are inadequate to accommodate a grass nest lining and eggs or nestlings. A tube diameter of 1⅛–3 inches works well for some species. Thus birds are forced to use the enlarged artificial nesting chambers 38 at the rear of artificial nesting structure 30 where contents are easily accessible. A chamber being 3½–5½ inches in height, 3½–5½ inches in width and 3½–6½ inches in length works well for some species. The lengths of artificial nest tubes 34 safely distance nesting chambers 38 from predators reaching through entrances 33. An artificial nest tube length of 18–30 inches works well for some species.

The separate back access doors 39, for individual artificial nesting chambers 38, permit temporary opening of any one without simultaneous disturbance of others.

Removable chamber shields 40 protect the artificial nesting chambers 38 from rain and solar heat. Roof panel 41 protects artificial nesting structure 30 from rain and solar heat.

Catch tray 44 disposed at the base of upright face 31 catches any loose debris.

Camouflage dirt 42 can be spread thinly on roof panel 41 and seeded to grow grass 43 which, even if soon dead would lend a natural appearance to artificial nesting structure 30.

Figure 7:
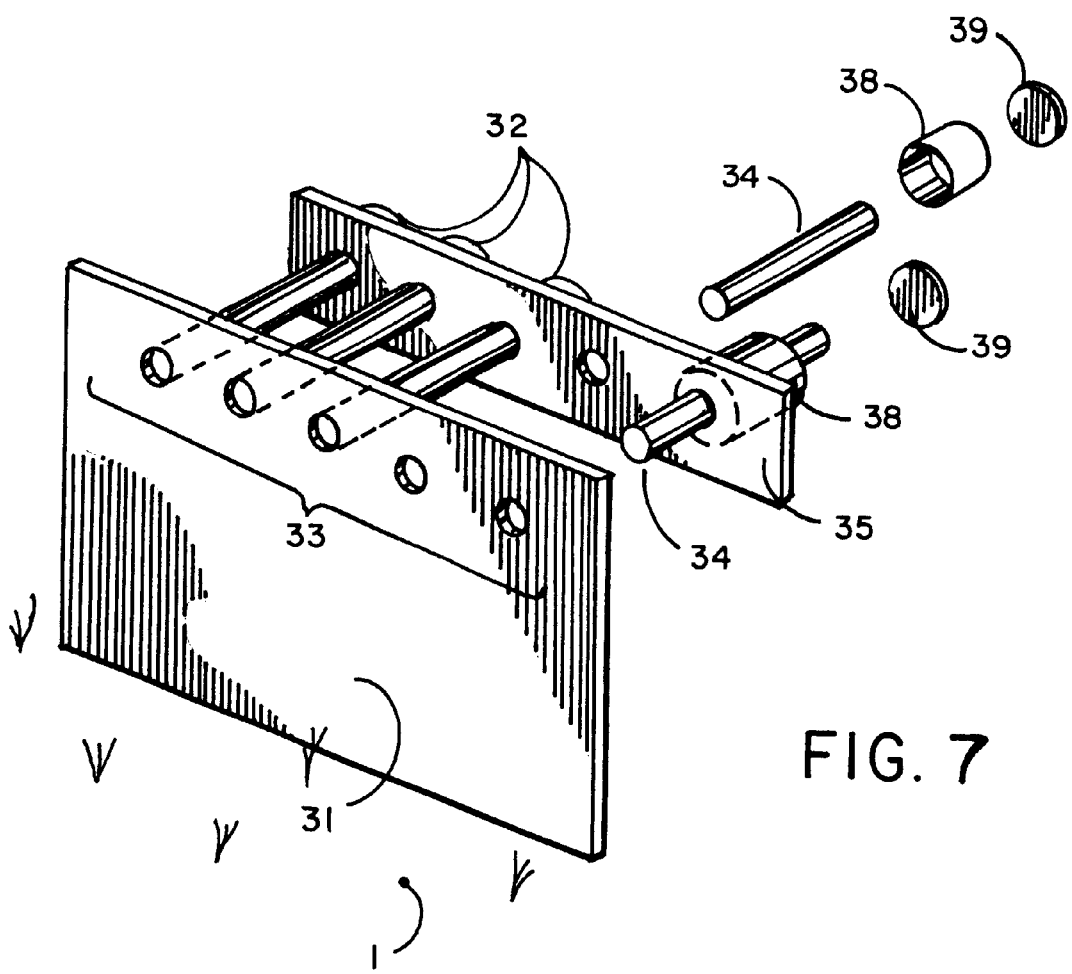
FIG. 7 illustrates an exploded perspective view showing in simplified form the relationships between several important elements of the present invention.

FIG. 7 is an exploded perspective view showing in simplified form the relationships between several important elements of the present invention. Several other elements have been omitted in FIG. 7 for illustration clarity.

Multiple artificial nest entrances 33 seen in FIG. 7 are arranged somewhat horizontally high along upright face 31 above its center to simulate natural nest entrances 22 high up on a natural earthen bank. This arrangement of multiple entrances high on a large upright surface with its lower edge in contact with, or close to, earth 1, or body of water or mound, etc., is to attract colony nesting, earth-burrowing birds to further investigate artificial nest entrances 33.

The birds may enter artificial nest entrances 33, pass through artificial nest tunnels 34 and enter artificial nesting chambers 38. These artificial structures may be sized to closely simulate the internal dimensions of natural nesting burrows.

Artificial nest tubes 34 and nesting chambers 38 may be made of pipe which is round in cross-section, simulating the rounded cross-sections of natural burrows. If artificial nest tube 34 and nesting chamber 38 are of steel pipe, they may be deformed (pressed) into (horizontally) elliptical cross-sections more closely simulating the low arches common in natural burrows.

Artificial nest tubes 34 and artificial nesting chambers 38 can also be made of other economical building materials such as plastic pipe or tubing, fixed clay pipe, or even wood boards.

Steel pipe may be allowed to rust (internally) to acquire a gritty, more natural appearance. Or the interiors of metal, plastic, fired clay, or wood artificial nest tubes 34 and nesting chambers 38 can be treated with a flat sand paint, an adhesive masonry slurry, or cast-in mud linings to further simulate the color and texture of natural burrows attractive to burrowing birds.

Artificial nest tubes 34 can be fastened to the back surface of upright face 31, or set in lips or rabbets cut in the back surface concentric with artificial entrance holes 33, or set in wet mortar concentric with artificial entrance holes 33 formed in the metal lath, depending on which material(s) upright face 31 has been made of.

Artificial nest tubes 34 are supported towards the back of artificial nesting structure 30 by back support board 35, preferably by resting in holes 50 cut through back support board 35. Thus, after each season, artificial nest tubes 34 could be withdrawn through holes 50 in back support board 35 for thorough cleaning to remove parasites and to recondition before replacing for annual reuse.

Alternatively artificial nest tubes 34 can also be cleaned in place. Artificial nesting chambers 38 can also be inspected or cleaned in place or when removed from back support board 35. These nest tubes 34 and nesting chambers 38 can alternatively supported and aligned by resting on, or suspension from, other structure at the back of artificial nesting structure 30.

Back access doors 39 can be as simple as snug fitting plugs, preferably with rabbeted lips 80 to block light from entering the interior.

The alignment of holes 50 in back support board 35 with artificial entrance holes 33 in upright face 31, as shown in this example, can permit simultaneous machining in manufacture.

Artificial upright face 31, artificial nest tubes 34, artificial nesting chambers 38, back support board 35, and back access doors 39 enclose the spaces which birds will use for nesting. Thus nestings are not subject to erosion, soil collapse, saturating rain, or certain predators.

Freestanding, designated artificial nesting structure 30, as seen in FIGS. 6 and 7, can be set up in a variety of landscapes, and disassembled, if necessary, for storage in the off-season.

Figure 8:
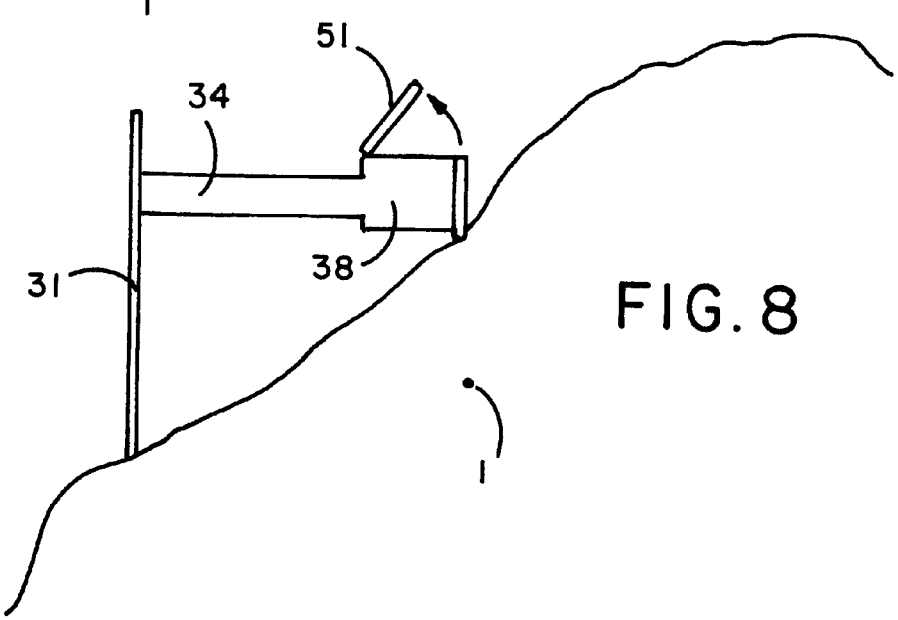
FIG. 8 illustrates a side view showing an alternate embodiment of the present invention in which the artificial nest tube and artificial nesting chamber are permanently fastened together.

FIG. 8 is a side view showing an alternate embodiment of the present invention in which artificial nest tube 34 and artificial nesting chamber 38 are permanently fastened together. Top access door 51 permits top access when earth 1 (hillside or mound) would prevent rear access to nesting chamber 38.

Figure 9:
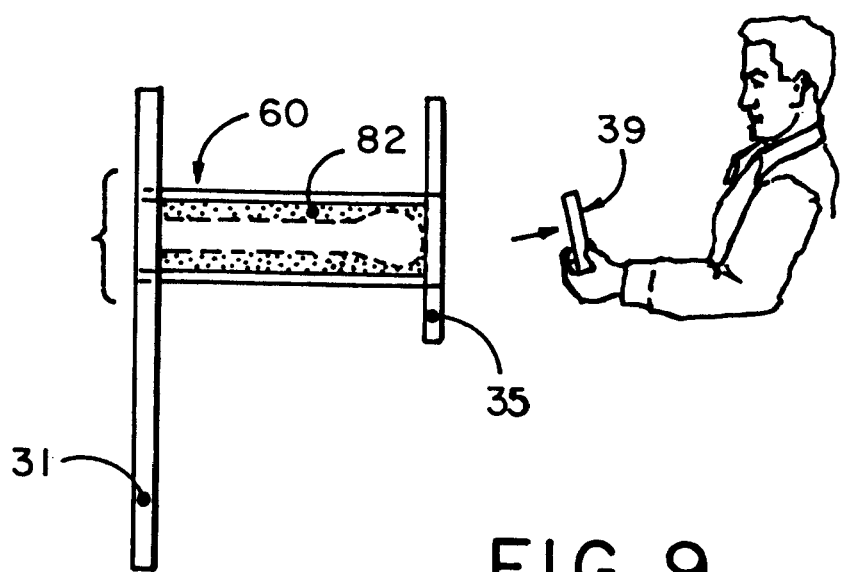
FIG. 9 illustrates a side view of a further alternate embodiment of the invention having a tube of a diameter large enough to accommodate both a nesting tunnel and a nesting chamber.

FIG. 9 illustrates a side view showing another alternate embodiment of the invention having a relatively large diameter pipe or tubing intended to accommodate both a nesting tunnel and a nesting chamber. A diameter of 3½–5½ inches can work well for some species. This embodiment can be packed or partially filled with fine sand 82, or material having similar characteristics, to allow burrowing birds to dig within a protective artificial structure. Such an embodiment can be accessed from the rear through back access doors 39. It could also be loaded from the front if enlarged hole 61 were formed in upright face 31.

Figure 10:
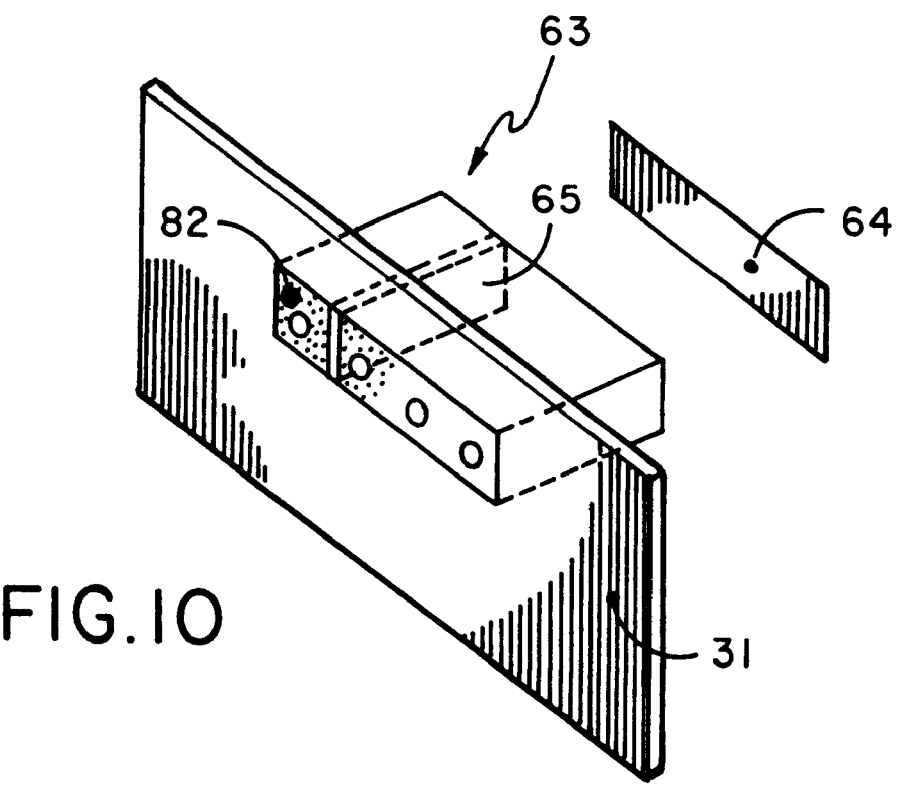
FIG. 10 illustrates a front perspective view of a still further alternate embodiment of the invention in which the multi-nest capacity container can be loaded with fine sand to allow burrowing birds to dig within a protective artificial structure.
Figure 11:
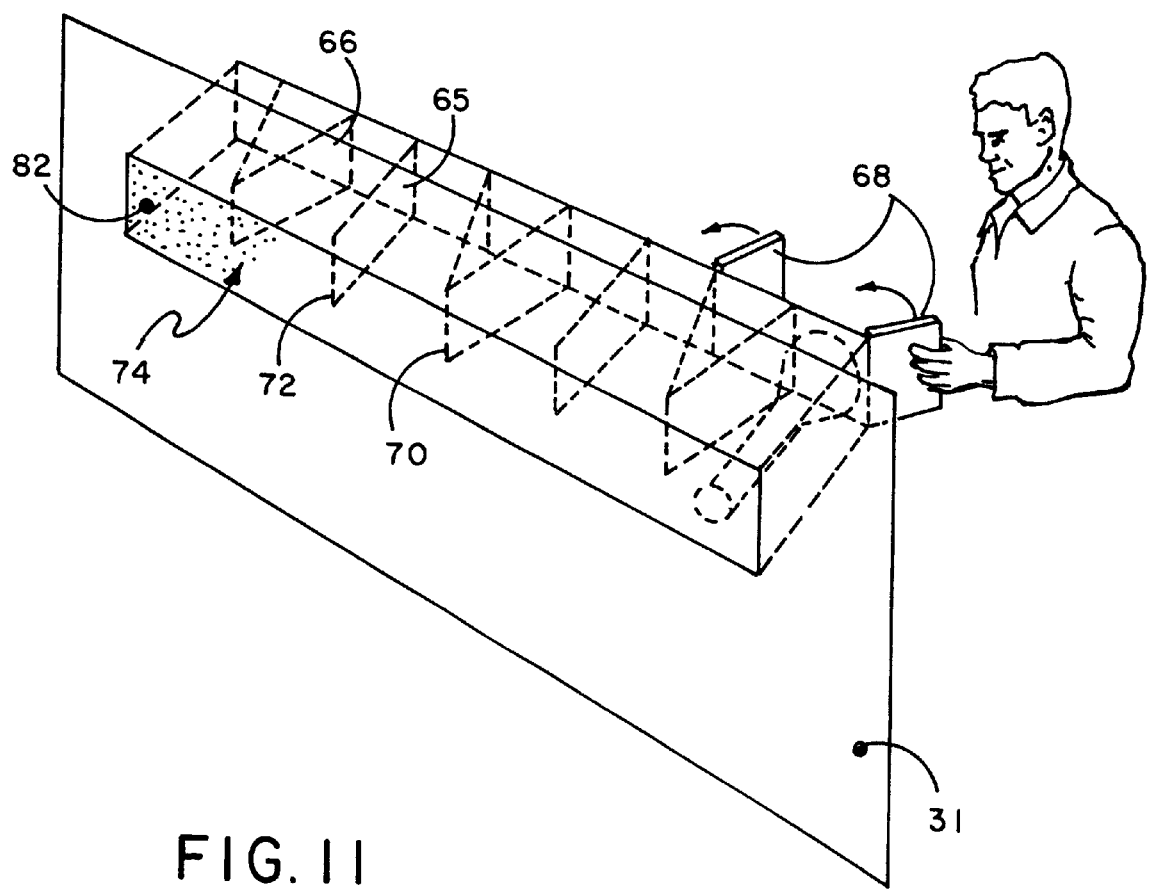
FIG. 11 illustrates a front perspective view of an embodiment similar to that of FIG. 10 with tunnel directional members leading to rear access doors.

FIG. 10 illustrates a front perspective view of a still further alternate embodiment of the invention in which multi-nest capacity container 63 can be loaded with fine sand 82, or material having similar characteristics, to allow burrowing birds to dig within a protective artificial structure. Nests could be accessed by minimal human digging from rear removable wall 64. One or more partitions 65 can be used between nests. FIG. 11 illustrates an alternate embodiment where partitions 66 can form a V shape with another to direct the tunnels to access doors 68. The tips 70 of the V-shaped partitions and/or front ends 72 of partitions 65 can extend to front opening 74 or not as desired. Such multi-nest capacity container 74 is open at upright face 31. A number of vertical partitions 65 and 66 extend from the back of the nesting container 74 toward the open front of container 74. However, partitions 65 and 66 are set back from upright face 31. Thus, when multi-nest capacity container 74 is packed with sand 82 or fine soils, these partitions are not visible from the front, and a relatively large continuous upright surface of preferred digging material is presented to the birds in more natural form.

Partitions 65 and 66 may not necessarily be parallel, but can effectively funnel the digging of the birds towards the back access doors, such as doors 68.

Figure 12:
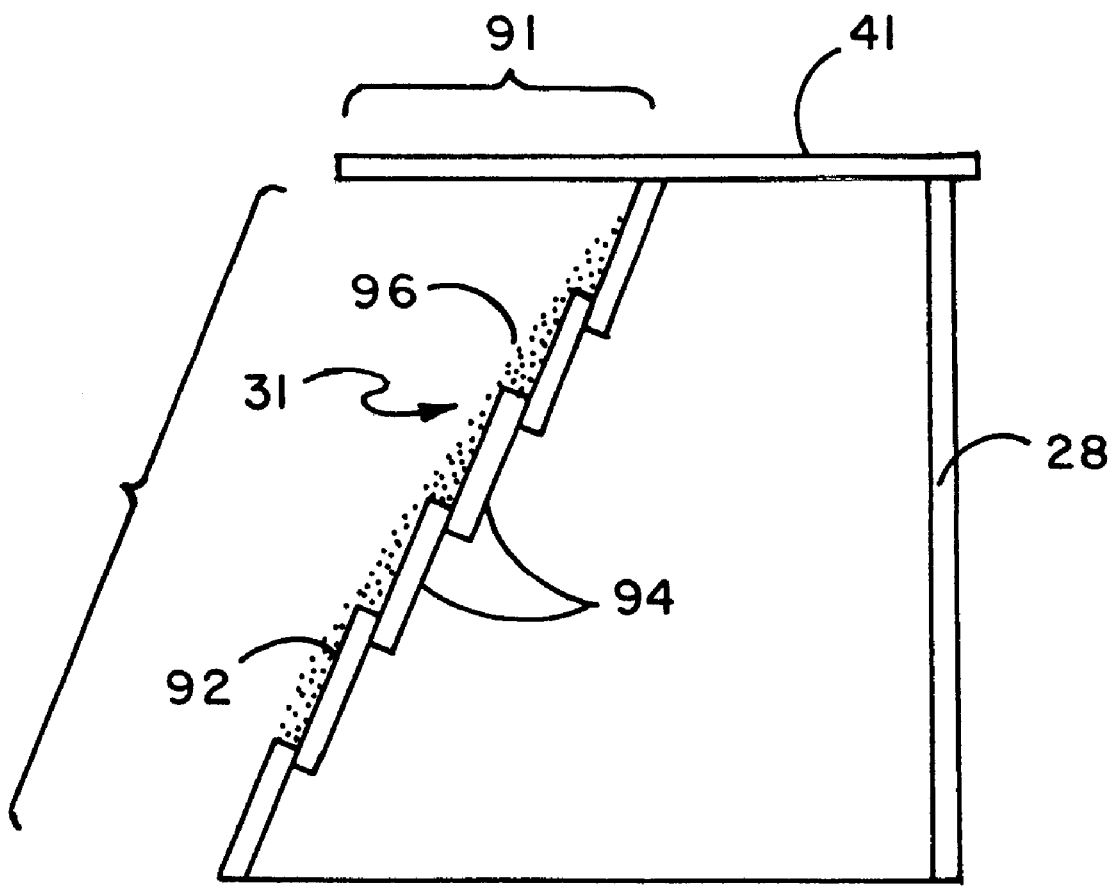
FIG. 12 illustrates a side view of an embodiment of the invention in which a stepped, rearwardly inclined front wall and an overhanging roof help to retain soil applied to the surface of the front wall.

FIG. 12 illustrates a cross-sectional side view of an embodiment of the invention which utilizes a rearwardly inclined, stepped front wall 92 made of a plurality of strips 94 of material, such as wood, shown disposed at approximately a 30 degree angle from the vertical. The stepped exterior surface allows for the application and good adherence thereto of mud 96. Roof panel 41 extends forward from back vertical portion 28 and has a portion 91 extending and overhanging over inclined upright face 31. Not seen in this view are the nest tubes or chambers.

Although the present invention has been described with reference to particular embodiments, it will be apparent to those skilled in the art that variations and modifications can be substituted therefor without departing from the principles and spirit of the invention.

I claim:

1. A nesting structure for burrowing birds having a front, a back, a top and a bottom, comprising:

a substantially upright front wall having a cross-sectional center axis at least within 45 degrees of true vertical, said front wall having a length, a height, a relatively minimal thickness, a top, a bottom, an outer surface, an inner surface, first and second ends, said front wall being disposed at the front of said structure;

a plurality of openings defined in said front wall;

a plurality of elongated tube-like hollow members each having a cross-sectional dimension, a length, an open front end and an open back end, each of said hollow members being substantially concentrically aligned with one of said openings in said front wall, said hollow members disposed for said burrowing birds to pass through said openings and enter said substantially concentrically disposed hollow members, said open front ends of said hollow members being disposed at said front wall at said openings in said front wall, said hollow members being substantially horizontally disposed within 30 degrees of true level horizontal such that said back ends of said hollow members extend toward said back of said nesting structure;

at least one substantially upright back support member having a length, a height, a relatively minimal thickness, a top, a bottom, an inner surface, an outer surface, first and second ends, said back support member being disposed at the back of said nesting structure and defining a space between said back support member and said front wall;

a plurality of openings defined in said back support member, said openings arranged such that said open back ends of said hollow members are substantially concentrically aligned with said openings in said back support member and said back ends of said hollow members are at least indirectly supported by said back support member;

a roof covering said top of said nesting structure and sheltering said space between said front wall and said back support member;

a plurality of hollow nesting chambers each associated with one of said hollow members, each of said hollow nesting chambers being at least indirectly supported by said back support member, each of said hollow nesting chambers being open to the front and enterable by burrowing birds passing through said hollow members; and a plurality of access doors each positioned in one of said hollow nesting chambers, said doors being openable and closeable.

2. The nesting structure of claim 1 wherein said elongated hollow members project beyond said outer surface of said back support member.

3. The nesting structure of claim 1 wherein said elongated hollow members do not project beyond said outer surface of said back support member.

4. The nesting structure of claim 1 wherein said internal cross-sectional dimensions of said elongated hollow members are sufficient to accommodate nests of burrowing birds anywhere along their lengths.

5. The nesting structure of claim 1 wherein said internal cross-sectional dimensions of said elongated hollow members are not sufficient to accommodate nests of burrowing birds along the portion thereof closer to said front wall, but are internally enlarged along the portion thereof closer to said back support member to accommodate said nests of said burrowing birds.

6. The nesting structure of claim 1 wherein said open back ends of said elongated hollow members are aligned with said hollow nesting chambers of sufficient internal cross-sectional dimensions to accommodate nests of said burrowing birds, said hollow nesting chambers being supported by said back support member with the interiors of said hollow nesting chambers being accessible to humans through said access doors in said nesting chambers.

7. The nesting structure of claim 6 wherein said elongated hollow members are not of sufficient internal cross sectional dimensions to accommodate nests of said burrowing birds anywhere along their lengths.

8. The nesting structure of claim 1 further including:

at least one upper frame member interconnecting the top of said front wall and the top of said back support member beneath said roof; and at least one lower frame member interconnecting the bottom of said front wall and the bottom of said back support member.

9. The nesting structure of claim 1 wherein said upright front wall is comprised of a plurality of stepped individual strips contacting one another to form a rearwardly inclined front wall.

10. The nesting structure of claim 1 wherein said roof extends forward to overhang said front wall.

11. The nesting structure of claim 9 wherein said roof extends forward to overhang said rearwardly inclined front wall.

12. The nesting structure of claim 1 wherein said front wall has a surface area and said nesting chambers each have a cross-sectional area as viewed from the front and wherein said surface area of said front wall is substantially greater than the cumulative cross-sectional area of said nesting chambers.

13. A nesting structure for burrowing birds having a front, a back, a top and a bottom, comprising:

a substantially upright front wall having a cross-sectional center axis within 45 degrees of true vertical, said front wall having a length, a height, a relatively minimal thickness, a top, a bottom, an outer surface, an inner surface, first and second ends, said front wall being disposed at the front of said nesting structure;

at least one opening defined in said front wall;

at least one box form hollow member having an open front end and an open back end, said hollow member being filled with sand-like material, said hollow member being associated with a respective opening in said front wall and disposed such that said burrowing birds can pass through said opening and enter said hollow member to form tunnels and nest chambers in said sand-like material, said front end of said hollow member being disposed and supported at said front wall at said opening in said wall, said hollow member being substantially horizontally disposed within 30 degrees of true horizontal such that said back end of said hollow member is extended toward and supported at said back of said nesting structure; and at least one substantially upright back support member having a length, a height, a relatively minimal thickness, a top, a bottom, an inner surface, an outer surface, first and second ends, said back support member being disposed at the back of said nesting structure and defining a space between said back support member and said front wall.

14. The nesting structure of claim 13 wherein said box form hollow member includes at least one substantially vertically disposed partition having a front and a rear, said partition extending from near the front of said hollow member to the rear of said hollow member between nests.

15. The nesting structure of claim 14 wherein selected partitions can be in a V shape to direct burrowing birds to tunnel in desired locations.

16. The nesting structure of claim 13 further including at least one access door positioned at the rear of said hollow member.

17. The nesting structure of claim 14 further including a plurality of access doors each positioned at the rear of each nesting chamber separated by said partitions.

18. The nesting structure of claim 13 wherein said front wall has a surface area and said nesting chambers each have a cross-sectional area as viewed from the front and wherein said surface area of said front wall is substantially greater than the cumulative cross-sectional area of said nesting chambers.

19. The nesting structure of claim 13 wherein said roof extends forward to overhang said front wall.

20. The nesting structure of claim 1 further including sand-like material in said hollow member and nesting chamber.

* * * * *